Figure 1:
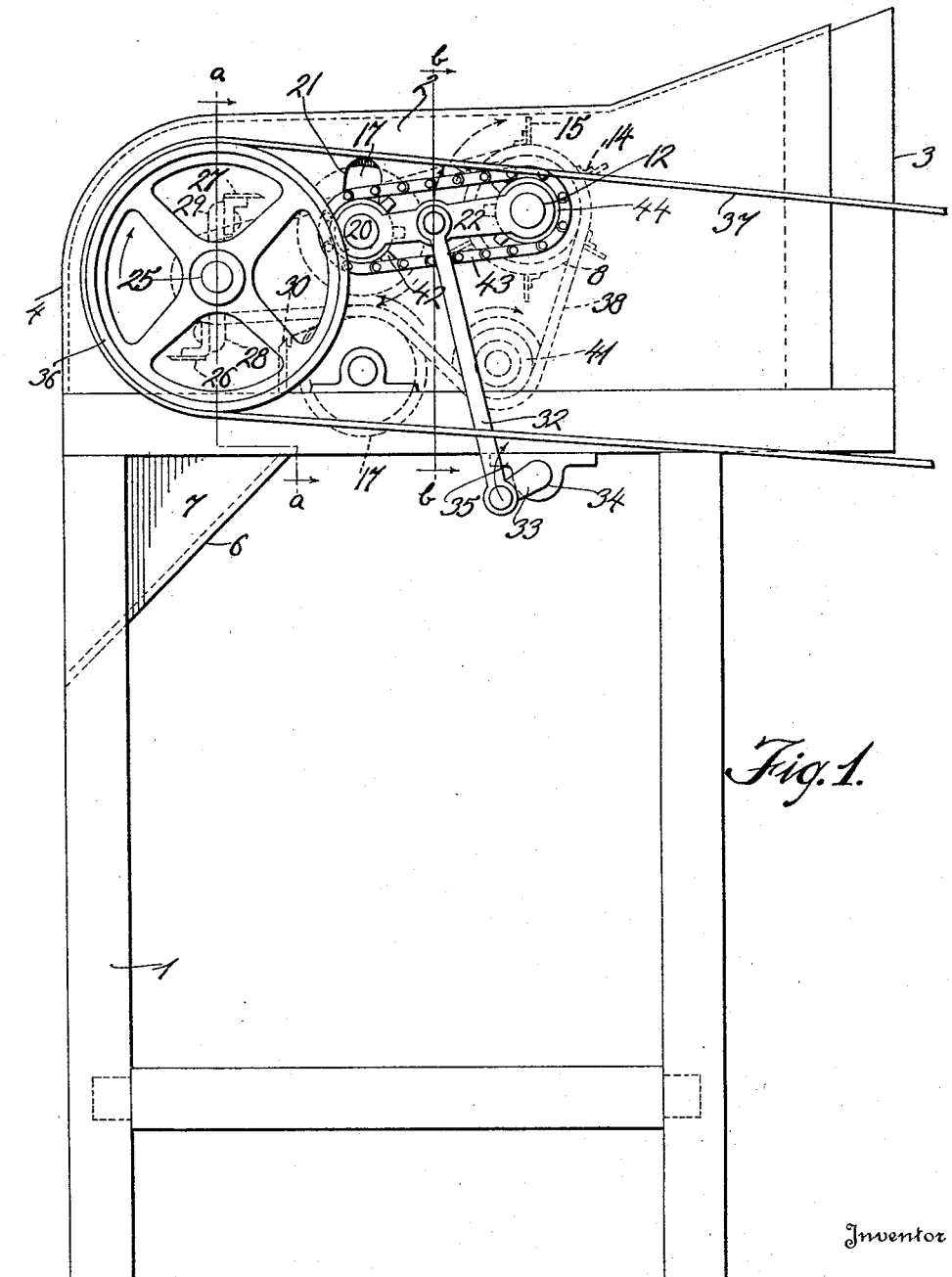

D. G. HEEBNER.
STRAW CUTTING MACHINE.
APPLICATION FILED SEPT. 18, 1916.
1,213,192.   Patented Jan. 23, 1917.
3 SHEETS—SHEET 2.
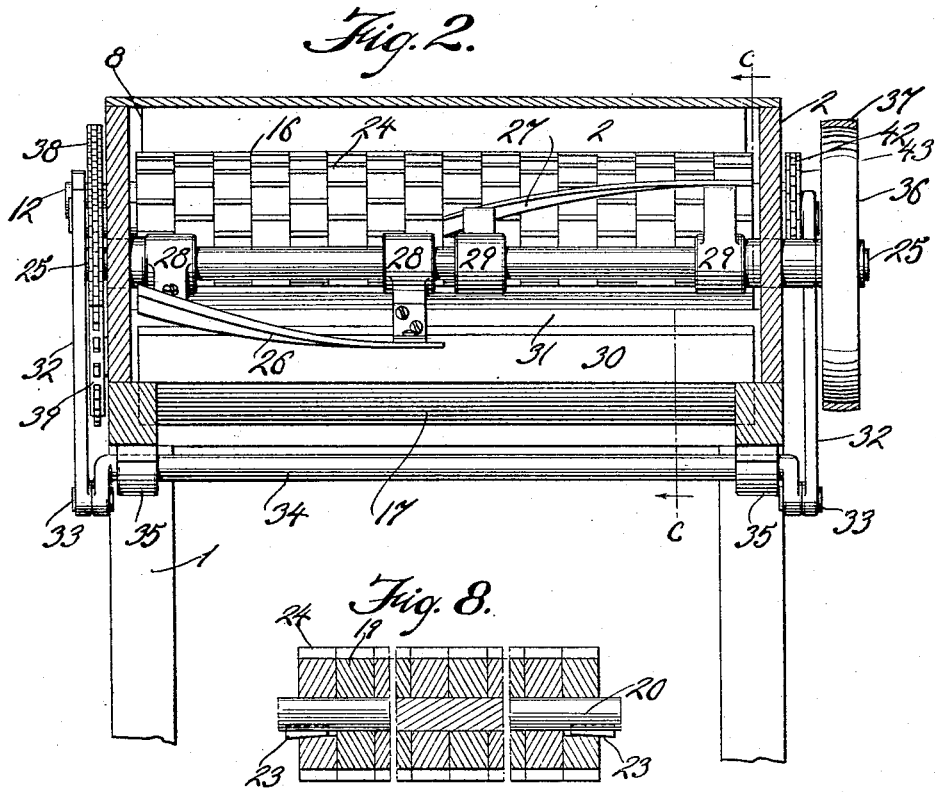
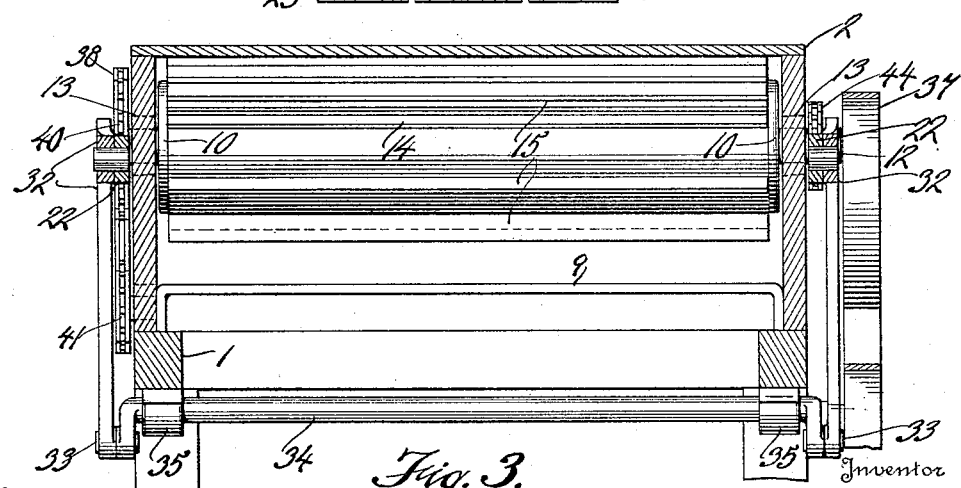
Witnesses
H. P. Harwood
C. R. Ziegler
Inventor
Daniel G. Heebner
By Joshua R. H. Potts
His Attorney

D. G. HEEBNER.
STRAW CUTTING MACHINE.
APPLICATION FILED SEPT. 18, 1916.

1,213,192.

Patented Jan. 23, 1917.
3 SHEETS—SHEET 3.

Witnesses
H. P. Harwood
C. R. Ziegler

Inventor
Daniel G. Heebner
By Joshua R. H. Potts
His Attorney

UNITED STATES PATENT OFFICE.

DANIEL G. HEEBNER, OF LANSDALE, PENNSYLVANIA.

STRAW-CUTTING MACHINE.

1,213,192.

Specification of Letters Patent.

Patented Jan. 23, 1917.

Application filed September 18, 1916. Serial No. 120,627.

*To all whom it may concern:*

Be it known that I, DANIEL G. HEEBNER, a citizen of the United States, residing at Lansdale, in the county of Montgomery and State of Pennsylvania, have invented certain new and useful Improvements in Straw-Cutting Machines, of which the following is a specification.

My invention consists of an improved straw cutting machine.

One object of my invention is to provide a straw cutting machine which will be of simple construction and which can be operated with comparatively little power.

Another object is to provide my improved machine with means which permits lumps to pass through the machine without straining or otherwise injuring any of the parts thereof.

A further object is to so construct my improved machine that it will be operative to cut straw in such lengths that it may be easily handled, stacked, or compressed into bales.

A still further object of my invention is to provide means for insuring an even movement of the straw to a cutting means which I employ, so that a constant feed is attained.

These objects, and other advantageous ends which will be described hereinafter, I attain in the following manner, reference being had to the accompanying drawings in which—

Figure 1 is a side elevation of my improved straw cutting machine. Fig. 2 is a section on the line *a—a* of Fig. 1. Fig. 3 is a section on the line *b—b* of Fig. 1. Fig. 4 is a section on the line *c—c* of Fig. 2. Fig. 5 is a fragmentary elevation of the side of my invention opposite to that shown in Fig. 1. Fig. 6 is an end view of a beater and feeding roll which forms a part of my invention. Fig. 7 is a fragmentary section of one end of the roll shown in Fig. 6, and Fig. 8 is a sectional view, partly broken away, showing an upper feed roll which I employ.

Referring to the drawings, 1 is a supporting structure or frame which forms a foundation for an upper casing or hood 2 which has a flared open end 3 into which the straw is fed. The opposite end is closed as shown at 4, but has an opening 5 in its bottom through which the cut straw falls onto an inclined board 6 which forms the bottom of a chute 7.

A roll 8 is positioned within the casing 2 and acts as a beater to beat the incoming straw toward the floor 9 in the casing. This roll 8 is preferably made of wood, and has plates 10 secured to its opposite ends by screws 11. These plates 10 have trunnions 12 which serve as the journals for the roll and are mounted in suitable bearings 13 in opposite sides of the casing 2.

The roll 8 has a series of ribs 14 to which are attached strips 15 of leather or other flexible material which, when the roll 8 is rotated, operate to wipe the straw, said wiping action serving to slightly compact the straw and feed it between two feed rolls 16 and 17.

The feed roll 17 is preferably made cylindrical and plain as clearly shown in Fig. 4, and is mounted in bearings 18 and positioned below the feed roll 16. The feed roll 16 comprises a series of disks 19, preferably of metal, which are mounted in laminated formation on a shaft 20, the opposite ends of this shaft passing through slots 21 in opposite sides of the casing 2 and being journaled within the free ends of two arms 22 which are pivotally supported on the trunnions 12 of the roll 8.

The end disks 19 are each secured to the shaft 20 through the medium of wedge keys 23, and the intermediate of the disks are securely held together when these disks 19 are forced toward each other to both press the disks together and to lock the end disks against rotation relatively to the shaft 20.

The intermediate disks 19, by frictional engagement with each other and with the end disks 19, are also securely held against rotation relatively to said shaft 20. Each of the disks 19 is provided on its peripheral surface with a series of transversely extending ribs 24. These ribs are preferably spaced equally throughout the circumference of the disk, and are so positioned on the shaft 20 that the ribs of each disk are opposite the spaces between the ribs on the adjacent disks. This presents a staggered formation of the ribs 24 as is clearly shown in Fig. 2, and serves to permit the proper holding of the straw between the feed rolls while cutting means hereinafter described acts to sever the straw.

A shaft 25 has its opposite ends journaled in the sides of the casing 2, said shaft being designed to support two cutting blades or knives 26 and 27. These blades are curved spirally but act to cut in a cylindrical path.

The blades are adjustably mounted on two pair of arms 28 and 29 respectively, and are substantially spaced at one hundred and eighty degrees (180°) apart. That is to say, similar portions of each of the cutting blades are at one hundred and eighty degrees (180°) to each other with respect to the axis of the shaft 25 so as to insure an even cutting of the straw.

A knift blade 30 is secured to one face of a transverse beam 31 and extends entirely across the machine. The knives 26 and 27 each co-act with substantially one-half of the length of the blade 30, so that as the straw passes over the upper surface of the beam 31 and knife 30, the blades 26 and 27 will, when the shaft 25 is rotated, act to cut the straw.

The arms 22 are each pivotally connected to links 32 at opposite sides of the machine, and these links 32 in turn are respectively connected to the free ends of crank arms 33, said crank arms being formed at opposite ends of a rocker shaft 34, said rocker shaft being mounted in depending bearings 35 on the supporting structure 1.

With this construction, it will be seen that if lumps of straw are fed between the feed rolls 16 and 17, the upper roll will move upwardly to permit the lump to pass therebetween. If the lump passes adjacent one end of the roll 16, the links 32 and rocker shaft 34 acts to move the entire roll upwardly so as to prevent any strain or bending action on the journals which otherwise would occur if just one end of the upper feed roll was raised.

By the construction illustrated, it will be noted that if one end of the roller 16 tends to raise, the adjacent link 32 will act to turn the rocker shaft 34 and thereby push upwardly on the opposite link 32 and tend to raise the opposite end of said roll 16.

The knife shaft 25 is rotated through the medium of a large pulley 36 having a drive belt 37 which may be attached to a threshing machine (not shown) or directly to any source of power. The opposite end of the shaft 25 is provided with a sprocket wheel 37 and a chain 38 operatively connects this sprocket 37 with sprockets 39 and 40 which are secured to rotate the lower feed roll 17 and the wiping or beating roll 8, an idler sprocket 41 being provided to attain the proper degree of intermesh between the chain and the several sprockets as clearly shown in Fig. 5.

The upper feed roll 16 is driven through the medium of a sprocket wheel 42 and chain 43 which operatively connects a sprocket 44 on the opposite end of the roll 8. The straw as it is fed through the open end 3 of the casing 2, is wiped by the strips 15 on the roll 8, said wiping action serving to slightly compress the straw and also to assist in moving the straw between the bite of the feed rolls 16 and 17. These rolls rotate to both feed the straw over the top edge of the knife 30 so that the rotation of the knife blades 26 and 27 acts to sever the straw in predetermined lengths. The formation and construction of the upper feed roll acts to securely hold the straw so as to insure that the knives sever the same. Furthermore, the location of the knives 26 and 27 with respect to the feed roll 16 serves to keep said latter roll clear, since it will be noted that said knives 26 and 27 operate in a path close to the outer surface of the roll 16 and any straw which has a tendency to wind around said roll 16 is stripped by said knives.

By having the drive for certain of the rolls on one side of the casing 2, and the drive for the feed roll 16 on the opposite side of the casing 2, an even and steady operation is attained with practically no vibration.

The roll 8 constructed as above described, may be made of wood and may be made comparatively light in weight, and the plates 10 may be made of cast iron or other metal and are easily assembled.

My invention is extremely durable and of such simple construction that it requires but little attention to keep it in proper order.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. The combination in a straw cutting machine, of cutting means, a pair of feed rolls, one of said rolls having a plurality of ribs arranged in staggered formation and operative to engage and hold the straw during the cutting of the latter by said cutting means, and another roll having flexible strips designed to wipe and slightly compress the straw prior to the passing of the same between the feed rolls, substantially as described.

2. The combination in a straw cutting machine, of a casing, cutting means, a pair of feed rolls one mounted above the other, means for rotating said feed rolls, means forming movable bearings for said upper feed roll at opposite sides of the casing, a rocker shaft, another roll having flexible strips designed to wipe and slightly compress the straw prior to the passing of the same between the feed rolls, and links connecting said rocker shaft with the movable bearings, substantially as described.

3. The combination in a straw cutting machine, of a casing, a supporting structure therefor, cutting means within said casing, a pair of feed rolls positioned within said casing and one mounted above the other, the upper feed roll having journal portions extending through slots in opposite sides of the casing, a beating roll positioned within said casing and having journal portions extending through the sides thereof, arms pivotally mounted on said journal portions of the beating roll and forming bearings for said journal portions of the upper feed roll, a rocker shaft mounted on said supporting structure and extending across said casing, said rocker shaft having crank arms thereon, and links respectively connecting said first-mentioned arms and the crank arms of the rocker shaft, substantially as described.

4. A straw cutting machine including a casing, cutting means, two rolls one mounted above the other and operative to feed the straw to the cutting means, a wiping roll having end plates secured thereto and provided with trunnions, said trunnions forming journals for said roll and mounted in said casing, and flexible strips secured to the surface of said roller and operative to wipe and slightly compress the straw prior to the passing of the same to the feeding means, substantially as described.

In testimony whereof I have signed my name to this specification in the presence of two subscribing witnesses.

DANIEL G. HEEBNER.

Witnesses:
S. C. MOYER,
A. D. JOHNSON.

Copies of this patent may be obtained for five cents each, by addressing the "Commissioner of Patents, Washington, D. C."